United States Patent
Pisklak et al.

(10) Patent No.: US 11,142,679 B2
(45) Date of Patent: Oct. 12, 2021

(54) TWO-PART THIXOTROPIC LOST CIRCULATION SLURRY

(71) Applicant: Halliburton Energy Services, Inc., Houston, TX (US)

(72) Inventors: Thomas J. Pisklak, Cypress, TX (US); Samuel J. Lewis, The Woodlands, TX (US); Paul J. Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/964,291

(22) PCT Filed: Mar. 29, 2018

(86) PCT No.: PCT/US2018/025258
§ 371 (c)(1),
(2) Date: Jul. 23, 2020

(87) PCT Pub. No.: WO2019/190534
PCT Pub. Date: Oct. 3, 2019

(65) Prior Publication Data
US 2021/0032526 A1 Feb. 4, 2021

(51) Int. Cl.
*C09K 8/487* (2006.01)
*C04B 28/18* (2006.01)
(Continued)

(52) U.S. Cl.
CPC ............ *C09K 8/487* (2013.01); *C04B 28/18* (2013.01); *E21B 43/16* (2013.01); *C04B 2103/0085* (2013.01)

(58) Field of Classification Search
CPC . C09K 8/487; C04B 28/18; C04B 2103/0085; E21B 43/16
See application file for complete search history.

(56) References Cited

U.S. PATENT DOCUMENTS

| | | |
|---|---|---|
| 5,501,277 A | 3/1996 | Onan et al. |
| 9,255,031 B2 | 2/2016 | Pisklak et al. |

(Continued)

FOREIGN PATENT DOCUMENTS

| | | |
|---|---|---|
| WO | 2015026713 A1 | 2/2015 |
| WO | 2015061342 A1 | 4/2015 |

(Continued)

OTHER PUBLICATIONS

International Search Report and Written Opinion dated Dec. 19, 2018; International PCT Application No. PCT/US2018/025258.

*Primary Examiner* — Crystal J Miller
(74) *Attorney, Agent, or Firm* — McGuireWoods LLP

(57) ABSTRACT

Methods and systems of reducing lost circulation in a wellbore are provided. An example method includes providing a pozzolan slurry comprising a pozzolanic material and water; and providing a calcium slurry comprising a calcium source, a high pH activator, and water. The method further comprises allowing the pozzolan slurry and the calcium slurry to remain separate; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent. The method additionally comprises mixing the pozzolan slurry and the calcium slurry to form a two-part thixotropic lost circulation slurry after the allowing the pozzolan slurry and the calcium slurry to remain separate. The method also includes introducing the two-part thixotropic lost circulation slurry to a lost circulation zone within the wellbore; and allowing or causing to allow the two-part thixotropic lost circulation slurry to set into a hardened mass within the lost circulation zone.

20 Claims, 3 Drawing Sheets

(51) Int. Cl.
    *E21B 43/16*     (2006.01)
    *C04B 103/00*     (2006.01)

(56) References Cited

U.S. PATENT DOCUMENTS

2009/0038800 A1*   2/2009   Ravi ................... C09K 8/467
                                                                                     166/292
2011/0162845 A1     7/2011   Ravi et al.

FOREIGN PATENT DOCUMENTS

WO         2018009425 A1     1/2018
WO     WO-2018009425 A1 *   1/2018   ............ C09K 8/516

* cited by examiner

TWO-PART THIXOTROPIC LOST CIRCULATION SLURRY

TECHNICAL FIELD

The present disclosure relates to the use of a two-part thixotropic lost circulation slurry, and more particularly, to the use of a two-part thixotropic lost circulation slurry to limit flow of treatment fluids into a lost circulation zone.

BACKGROUND

During the drilling of a wellbore, a drilling fluid is circulated in the wellbore to maintain structural integrity of the wellbore, to cool the drill bit as it rotates, and to carry the cuttings to the surface where they may be removed. One problem associated with drilling, as well as other wellbore operations, is the undesirable loss of drilling fluid into voids within the adjacent subterranean formation. This problem is referred to as "lost circulation," and the area of the formation into which the drilling fluid is lost is referred to as a "lost circulation zone." In addition to drilling fluids, problems with lost circulation may also be encountered with other treatment fluids, such as spacer fluids, completion fluids (e.g., completion brines), fracturing fluids, and cement compositions.

Several methods of reducing lost circulation have been performed. For example, various solid particulate materials have been used to fill the openings and void space of a lost circulation zone. However, these materials are not without drawbacks. Particulate materials are often not sufficient to fill or sufficiently block large openings. Additionally, the particulate materials may be sucked out of or removed from the lost circulation zone due to the vacuum created by a passing fluid and/or erosion of the surrounding area. Further, lost circulation materials typically cannot be pumped through a bottom hole assembly, as these solid particulates run the risk of clogging the openings. As such, special care is needed to introduce these solid particulate materials into the wellbore. Thus, the inability to mitigate or stop lost circulation can result in a loss of productive time and increased operational expenditures.

BRIEF DESCRIPTION OF THE DRAWINGS

Illustrative examples of the present disclosure are described in detail below with reference to the attached drawing figures, which are incorporated by reference herein, and wherein.

Figure 1:
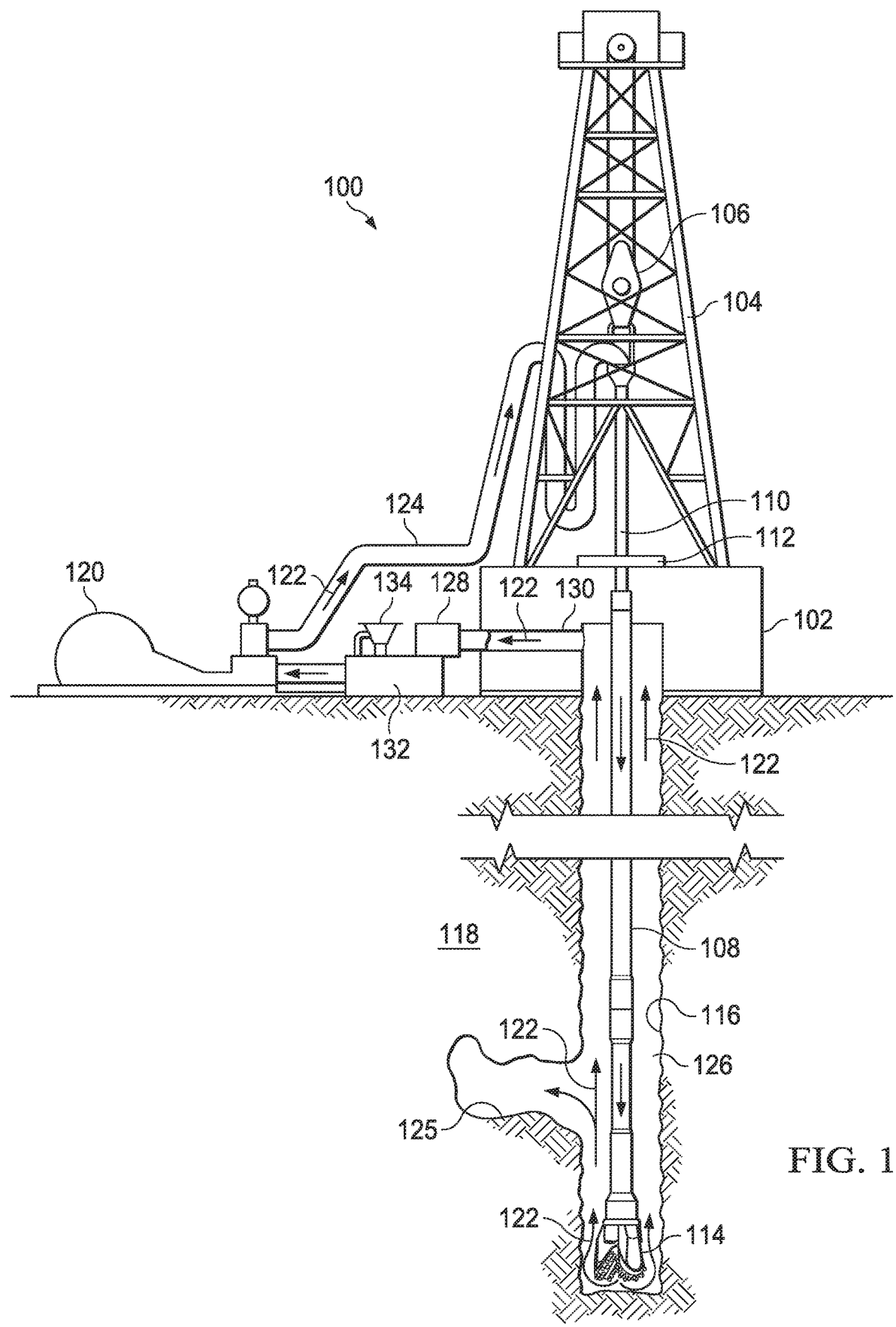
FIG. 1 is a schematic illustrating a system for using a two-part thixotropic lost circulation slurry while drilling equipment is present in a wellbore in accordance with the examples disclosed herein.

The illustrated figures are only exemplary and are not intended to assert or imply any limitation with regard to the environment, architecture, design, or process in which different examples may be implemented.

DETAILED DESCRIPTION

The present disclosure relates to the use of a two-part thixotropic lost circulation slurry, and more particularly, to the use of a two-part thixotropic lost circulation slurry to limit flow of treatment fluids into a lost circulation zone from a wellbore.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Treatment fluids can be employed in a variety of subterranean operations. As used herein, the terms "treatment," "treating," and other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Example treatment fluids may include, for example, spacer fluids, drilling fluids, fracturing fluids, cements, workover fluids, completion fluids, and the like.

In all examples, the two-part thixotropic lost circulation slurry comprises the combination of two discrete component slurries that are prepared and mixed separately. These component slurries may be stored indefinitely while they are separated. Once combined, the component slurries form the two-part thixotropic lost circulation slurry which hardens into a mass. This hardened mass reduces or prevents fluid flow into the lost circulation zone. The component slurries as well as the two-part thixotropic lost circulation slurry may be thixotropic. As such, the slurries may gel in the absence of shear force allowing the slurries to resist fluid flow into a lost circulation zone. The two discrete component slurries are a pozzolan slurry and a calcium slurry. The pozzolan slurry and a calcium slurry are prepared and stored separately until desired for use as their combination results in the formation of the two-part thixotropic lost circulation slurry which sets into a hardened mass over time and becomes unpumpable after sufficient hardening. Each component slurry remains in an extended-life state (i.e. remaining in a pumpable fluid state for at least about one day [e.g., at least about 1 day, about 2 weeks, about 2 years or more] at room temperature in quiescent storage). In examples, the pozzolan slurry may generally comprise a pozzolanic material, a weighting agent, a thixotropic material, a dispersant, and water. In some optional examples, the pozzolan slurry may further comprise a set retarder. The calcium slurry may generally comprise a calcium source, a weighting agent, a dispersant, a thixotropic material, and a high pH activator. In all examples, each individual component slurry may be stored at a well site or other storage site until needed. When needed, both component slurries may be mixed together in the lost circulation zone, at the surface prior to pumping, or in the work string while pumping downhole. The formed two-part thixotropic lost circulation slurry may then thicken and set into a hardened mass within a desired period.

Advantageously, because the reactive components of the component slurries are kept separate, additional additives or higher concentrations of additives (e.g., additional silica sources) may be added to each individual component slurry without risk of premature setting or gelation. Further advantageously, the individual component slurries may be capable of remaining in a pumpable fluid state for an extended period of time. For example, the individual component slurries may remain in a pumpable fluid state for at least about 1 day or longer. The two-part thixotropic lost circulation slurry may develop a hardened mass after mixing, even at relatively low temperatures. While the two-part thixotropic lost circulation slurry may be suitable for a number of subterranean lost circulation operations, it may be particularly suitable for use in subterranean formations having relatively low bottom hole static temperatures, e.g., temperatures less than about 200° F. or ranging from about 100° F. to about 200° F. In alternative examples, the two-part thixotropic lost circulation slurry may be used in subterranean formations having bottom hole static temperatures up to 450° F. or higher.

In all examples, the pozzolan slurry is kept separate from the calcium slurry until desired for use. The pozzolan slurry comprises a pozzolanic material. Examples of pozzolanic materials include, but are not limited to, fly ash, micro-fine silica, silica flour, silica fume, fumed silica, nanosilica, perlite, natural glass, synthetic glass, metakaolin, biomass ash, diatomaceous earth, a natural pozzolan (e.g., perlite), slag, cenospheres, or any combinations thereof. In some examples, the pozzolanic material may be a non-hydraulic pozzolan, i.e. a pozzolan that will not react when mixed with water in the absence of calcium. By way of example, some types of Class C fly ash may not be suitable for use as a pozzolanic material because the Class C fly ash may comprise lime and will therefore react when mixed with water to become cementitious.

As discussed above, some examples of the pozzolanic material may include fly ash. A variety of fly ashes may be suitable, including fly ash classified as Class F fly ash according to the American Petroleum Institute, API Specification for Materials and Testing for Well Cements, API Specification 10, Fifth Ed., Jul. 1, 1990. Class C fly ash comprises both silica and lime, and may be unsuitable for use in the pozzolan slurry as it may undesirably set when mixed with water. Class F fly ash generally does not contain a sufficient amount of lime to induce setting when mixed with water. Suitable examples of fly ash include, but are not limited to, POZMIX® A cement additive, commercially available from Halliburton Energy Services, Inc., Houston, Tex.

As discussed above, some examples of the pozzolanic material may include metakaolin. Generally, metakaolin is a white pozzolan that may be prepared by heating kaolin clay to temperatures in a range of about 600° C. to about 800° C.

As discussed above, some examples of the pozzolanic material may include a natural pozzolan. Natural pozzolans are generally present on the Earth's surface and set and harden in the presence of hydrated lime and water. Examples of natural pozzolans include, but are not limited to, volcanic glass, diatomaceous earth, volcanic ash, opaline shale, tuff, and any combinations thereof. The natural pozzolan may be ground or unground. Generally, the natural pozzolan may have any particle size distribution as desired for a particular application. In certain examples, the natural pozzolan may have a mean particle size in a range of from about 1 micron to about 200 microns. The mean particle size corresponds to d50 values as measured by particle size analyzers such as those manufactured by Malvern Instruments, Worcestershire, United Kingdom. In specific examples, the natural pozzolan may have a mean particle size in a range of from about 1 micron to about 200 microns, from about 5 microns to about 100 microns, or from about 10 microns to about 50 microns. In one particular example, the natural pozzolan has a mean particle size of less than about 15 microns. An example of a suitable commercial natural pozzolan is volcanic glass, which has a particle size of less than about 15 microns. It should be appreciated that particle sizes too small may have mixability problems while particle sizes too large may not be effectively suspended and may be less reactive due to their decreased surface area. One of ordinary skill in the art, with the benefit of this disclosure, should be able to select a particle size for the natural pozzolan suitable for use for a chosen application.

Some optional examples of the pozzolan slurry comprise a set retarder. Examples of set retarders include, but are not limited to, phosphonic acids, such as ethylenediamine tetra (methylene phosphonic acid), diethylenetriamine penta(methylene phosphonic acid), etc.; lignins and lignosulfonates, such as sodium lignosulfonate, calcium lignosulfonate, etc.; organic acids, such as citric acid, tartaric acid, etc.; synthetic co- or ter-polymers comprising sulfonate and carboxylic acid groups such as sulfonate-functionalized acrylamide-acrylic acid co-polymers; derivatives thereof, or mixtures thereof. Generally, the set retarder may be present in the pozzolan slurry in an amount sufficient to prevent setting of the pozzolanic slurry until mixed with the calcium slurry. In some examples, the set retarder may be present in the pozzolan slurry in an amount in the range of from about 0.01% to about 10% by weight of the pozzolanic material. In specific examples, the set retarder may be present in an amount ranging between and/or including any of about 0.01%, about 0.1%, about 1%, about 2%, about 4%, about 6%, about 8%, or about 10% by weight of the pozzolanic material. One of ordinary skill in the art, with the benefit of this disclosure, will recognize the appropriate concentration of set retarder for a chosen application.

In all examples, the calcium slurry is kept separate from the pozzolan slurry until desired for use. The calcium slurry comprises a calcium source. Examples of a calcium source include, but are not limited to, hydrated lime (i.e. calcium hydroxide), slaked lime (i.e. calcium hydroxide), limestone (i.e. calcium carbonate), quicklime (i.e. calcium oxide), calcium aluminate, calcium nitrate, any calcium salt, etc., and any combinations thereof. The calcium source may form a hydraulic composition with the pozzolanic material when the pozzolan slurry and the calcium slurry are mixed. The calcium source may be included in a pozzolanic material-to-calcium source weight ratio of about 10:1 to about 1:1, or, alternatively, a ratio of about 1:1 to about 5:1. The calcium source may be included in the calcium slurry in an amount in the range of from about 10% to about 100% by weight of the pozzolanic material to be mixed with the calcium source when used. In some examples, the calcium source may be present in an amount ranging between and/or including any of about 10%, about 20%, about 40%, about 60%, about 80%, or about 100% by weight of the pozzolanic material. In some examples, the hydraulically setting components of the two-part thixotropic lost circulation slurry (i.e. the combined slurry) may consist essentially of the pozzolanic material and the calcium source. For example, the two-part thixotropic lost circulation slurry may not comprise any additional components that hydraulically set in the presence of water (e.g., Portland cement or any other type of cement). One of ordinary skill in the art, with the benefit of this disclosure, will recognize the appropriate amount of a calcium source to include for a chosen application.

Examples of the calcium slurry comprise a high pH activator. Examples of the high pH activator include any materials that may raise the pH of the two-part thixotropic lost circulation slurry (i.e. the combined slurry) to a pH to induce the two-part thixotropic lost circulation slurry to set into a hardened mass. Examples of the high pH activator include, but are not limited to, Group IA and IIA hydroxides such as sodium hydroxide, magnesium hydroxide, potassium hydroxide, calcium hydroxide, and any combinations thereof. The high pH activator should be present in a concentration sufficient to induce the two-part thixotropic lost circulation slurry to set into a hardened mass. In some examples, the high pH activator may be added to the calcium slurry in an amount in the range of about 0.1% to about 20% by weight of the pozzolanic material to be mixed with the high pH activator when used. In specific examples, the high pH activator may be present in the calcium slurry in an amount ranging between and/or including any of about 0.1%, about 1%, about 5%, about 10%, about 15%, or about 20% by weight of the pozzolanic material. One of ordinary skill in the art, with the benefit of this disclosure, will recognize the appropriate amount of the high pH activator to include for a chosen application.

Those of ordinary skill in the art will appreciate that the two-part thixotropic lost circulation slurry generally should have a density suitable for a particular application. By way of example, the two-part thixotropic lost circulation slurry may have a density in the range of from about 4 pounds per gallon ("lb/gal") to about 20 lb/gal. In certain examples, the two-part thixotropic lost circulation slurry has a density in the range of from about 8 lb/gal to about 17 lb/gal. At least one of the pozzolan slurry or the calcium slurry comprises a weighting agent to increase the density of the two-part thixotropic lost circulation slurry when the pozzolan slurry and the calcium slurry are mixed. In a particular embodiment, both the pozzolan slurry and the calcium slurry comprise a weighting agent. Examples of suitable weighting agents may include, but are not limited to, iron oxides, barite, hematite, hausmannite, siderite, ilmenite, and any combinations thereof. In a particular example, the weighting agent has a specific gravity of 3 or greater. Those of ordinary skill in the art, with the benefit of this disclosure, will recognize the appropriate density for the two-part thixotropic lost circulation slurry for a particular application.

In all examples, at least one of the pozzolan slurry or the calcium slurry comprises a thixotropic material to increase the gel strength of the individual component slurries (i.e. the pozzolan slurry and/or the calcium slurry) and the two-part thixotropic lost circulation slurry (i.e, combined slurry) when the pozzolan slurry or the calcium slurry are placed in a lost circulation zone. The increased gel strength may prevent lost circulation while an individual component slurry is placed in a lost circulation zone and/or as the two-part thixotropic lost circulation slurry hardens into a mass when disposed in a lost circulation zone. The thixotropic materials also allow the individual component slurries as well as the two-part thixotropic lost circulation slurry to remain pumpable as a thin or low viscosity fluid. As such, the component slurries and the combined slurry may all be described as thixotropic fluids. These thixotropic fluids will remain fluid while exposed to the agitation of pumping (or any other agitation). However, when the fluids flow into a lost circulation zone and away from a source of agitation, the fluids will thicken to seal the lost circulation zone and prevent fluid migration into the lost circulation zone. If the combined slurry has been placed or formed in the sealed lost circulation zone, it will harden into a mass preventing it from being sucked out by a vacuum or removed by erosion of the surrounding formation.

Examples of suitable thixotropic materials may include, but are not limited to, clays such as illite, montmorillonite, hectorite, bentonite, sepiolite, synthetic versions thereof; polysaccharides such as welan gum, xantham gum, diutan, schleroglucans; and any combinations thereof. An example of a synthetic version of the above clays is Laponite®, a registered trademark of BYK Additives Ltd. The synthetic versions of the above clays may comprise aqueous mixtures of water and synthetic trioctahedral smectites which are similar to the natural clay hectorite. In some examples, the synthetics may be layered hydrous sodium lithium magnesium silicates, and some may be modified with tetrasodiumpyrophosphate.

In all examples, at least one of the pozzolan slurry or the calcium slurry comprises a dispersant. Examples of suitable dispersants include, without limitation, sulfonated-formaldehyde-based dispersants (e.g., sulfonated acetone-formaldehyde condensate), polycarboxylated ether dispersants, naphthalene sulfonate dispersants, sulfonated organic polymer dispersants, and any combinations thereof. While a variety of dispersants may be used in accordance with the disclosed examples, polycarboxylated ether dispersants may be particularly suitable for use in some specific examples. Without being limited by theory, it is believed that the polycarboxylated ether dispersants may synergistically interact with certain set retarders (e.g., phosphonic acid derivatives) resulting in formation of a gel with improved suspension of the pozzolanic material and the calcium source.

The dispersant may be included in either the pozzolan slurry and/or the calcium slurry in an amount in the range of from about 0.01% to about 5% by weight of the pozzolanic material. In specific examples, the dispersant may be present in an amount ranging between and/or including any of about 0.01%, about 0.1%, about 0.5%, about 1%, about 2%, about 3%, about 4%, or about 5% by weight of the pozzolanic material. One of ordinary skill in the art, with the benefit of this disclosure, will recognize the appropriate amount of the dispersant to include for a chosen application.

In all examples, the pozzolan slurry and the calcium slurry comprise an aqueous base fluid. The aqueous base fluid may be from any source provided that it does not contain an excess of compounds that may undesirably affect other components in the pozzolan slurry or the calcium slurry. Seawater or brines may be suitable for use in some examples. Further, the aqueous base fluid may be present in an amount sufficient to form a pumpable slurry of the pozzolan slurry and the calcium slurry. In certain examples, the aqueous base fluid may be present in the pozzolan slurry in an amount in the range of from about 33% to about 200% by weight of the pozzolanic material. In a specific example, the aqueous base fluid may be present in the pozzolan slurry in an amount in the range of from about 35% to about 85% by weight of the pozzolanic material. In certain examples, the aqueous base fluid may be present in the calcium slurry in an amount in the range of from about 33% to about 200% by weight of the calcium source. In a specific example, the aqueous base fluid may be present in the calcium slurry in an amount in the range of from about 35% to about 70% by weight of the calcium source. With the benefit of this disclosure, one of ordinary skill in the art will recognize the appropriate amount of aqueous base fluid for a chosen application.

FIG. 1 is a schematic illustrating a system for using a two-part thixotropic lost circulation slurry while drilling equipment is present in a wellbore in accordance with the examples disclosed herein. FIG. 1 illustrates an example technique for the introduction of a lost circulation treatment slurry 122 into a lost circulation zone 125 while drilling equipment is present in a wellbore 116. The lost circulation treatment slurry 122 may be the individual pozzolan slurry or the calcium slurry (i.e. either of the two component slurries), or the two-part thixotropic lost circulation slurry (i.e. the combined slurry). The lost circulation treatment slurry 122 may directly or indirectly affect one or more components or pieces of equipment associated with an exemplary wellbore drilling assembly 100, according to one or more examples. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

The two-part thixotropic lost circulation slurry may be introduced into the lost circulation zone 125 by various methods. In one method, the component slurries (i.e. the pozzolan slurry and the calcium slurry) do not mix substantially until both are placed in the lost circulation zone 125. In this method, a component lost circulation treatment slurry 122 of either the pozzolan slurry or the calcium slurry is introduced to the wellbore 116, pumped through the bottom hole assembly 114, pumped through the annulus 126, and placed into the lost circulation zone 125. The other component lost circulation treatment slurry 122 (the remaining of either the pozzolan slurry or the calcium slurry) may then be introduced into the lost circulation zone 125 in the same manner. The two component lost circulation treatment slurries 122 (i.e. the pozzolan slurry and the calcium slurry) may be separated during pumping in the drill string 108, annulus 126, and so on by mechanical methods such as a foam ball, dart, plug, etc. Alternatively, the two component lost circulation treatment slurries 122 may be separated by a fluid such as water, a spacer fluid, or an efficiency fluid. The pozzolan slurry and the calcium slurry may be introduced in any order. Due to the thixotropic nature of the pozzolan slurry and the calcium slurry, either one of the two component lost circulation treatment slurries 122 may gel and prevent or reduce fluid flow through the lost circulation zone 125. When both component lost circulation treatment slurries 122 are placed in the lost circulation zone 125, the two component lost circulation treatment slurries 122 mix to form the combined slurry (i.e. the two-part thixotropic lost circulation slurry). The two-part thixotropic lost circulation slurry may then be allowed to harden into a mass within the lost circulation zone 125.

In another method, the pozzolan slurry and the calcium slurry are mixed while being pumped in the wellbore to form the two-part thixotropic lost circulation slurry during the pumping process. In this example, the lost circulation treatment slurry 122 that exits the bottom hole assembly 114 and is introduced into the lost circulation zone 125 is the combined slurry (i.e. two-part thixotropic lost circulation slurry). When the two-part thixotropic lost circulation slurry is placed in the lost circulation zone 125, the two-part thixotropic lost circulation slurry may then be allowed to harden into a mass within the lost circulation zone 125.

In an additional method, the pozzolan slurry and the calcium slurry are mixed at the surface before use, and then the two-part thixotropic lost circulation slurry is introduced into the wellbore 116 and the drill string 108. In this example, the lost circulation treatment slurry 122 is the two-part thixotropic lost circulation slurry, and this two-part thixotropic lost circulation slurry is what is introduced into the wellbore 116 instead of the individual component slurries. At the surface, the individual component slurries are kept separate until desired for use. The two-part thixotropic lost circulation slurry, as the lost circulation treatment slurry 122, is introduced to the wellbore 116, pumped through the bottom hole assembly 114, pumped through the annulus 126, and placed into the lost circulation zone 125. After placement in the lost circulation zone 125, the two-part thixotropic lost circulation slurry may then be allowed to harden into a mass within the lost circulation zone 125.

With continued reference to FIG. 1, drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A bottom hole assembly 114 comprising a bit is attached to the distal end of the drill string 108 and is driven either by a downhole motor and/or via rotation of the drill string 108 from the well surface. As the bit of the bottom hole assembly 114 rotates, it creates a wellbore 116 that penetrates various subterranean formations 118.

A pump 120 (e.g., a mud pump) circulates a lost circulation treatment slurry 122 (i.e. either the pozzolan slurry, the calcium slurry, or the combined two-part thixotropic lost circulation slurry) through a feed pipe 124 and to the kelly 110, which conveys the lost circulation treatment slurry 122 downhole through the interior of the drill string 108 and through one or more orifices in the bottom hole assembly 114. The lost circulation treatment slurry 122 may be introduced prior to, concurrently with, or subsequent to the introduction of a drilling fluid or other treatment fluid (not shown) into the wellbore 116. The lost circulation treatment slurry 122 may then contact lost circulation zone 125. The lost circulation treatment slurry 122 that contacts lost circulation zone 125 may no longer be exposed to sufficient shear force to remain fluid and once static, the lost circulation treatment slurry 122 may thicken to seal lost circulation zone 125. After the combined two-part thixotropic lost circulation slurry is introduced to or formed in the lost circulation zone 125, it may eventually set to form a hardened mass. Any lost circulation treatment slurry 122 that does not contact a lost circulation zone 125 may be circulated back to the surface, either with or without the presence of another fluid (e.g., drilling fluid) via annulus 126 defined between the drill string 108 and the walls of the wellbore 116. At the surface, the recirculated lost circulation treatment slurry 122 exits the annulus 126 and may be conveyed to one or more fluid processing unit(s) 128 via an interconnecting flow line 130. After passing through the fluid processing unit(s) 128, a "cleaned" lost circulation treatment slurry 122 may be deposited into a nearby retention pit 132 (e.g., a mud pit). While illustrated as being arranged at the outlet of the wellbore 116 via the annulus 126, those skilled in the art will readily appreciate that the fluid processing unit(s) 128 may be arranged at any other location in the wellbore drilling assembly 100 to facilitate its proper function, without departing from the scope of the disclosure.

The lost circulation treatment slurry 122 may be added to a mixing hopper 134 communicably coupled to or otherwise in fluid communication with the retention pit 132. The mixing hopper 134 may include, but is not limited to, mixers and related mixing equipment known to those skilled in the art. In alternative examples, however, the lost circulation treatment slurry 122 may not be added to a mixing hopper 134. In at least one example, there could be more than one retention pit 132, such as multiple retention pits 132 in series. Moreover, the retention pit 132 may be representative of one or more fluid storage facilities and/or units where the disclosed lost circulation treatment slurries 122 may be stored, reconditioned, and/or regulated until desired for use.

As mentioned above, the disclosed lost circulation treatment slurries 122 may directly or indirectly affect the components and equipment of the wellbore drilling assembly 100. For example, the disclosed lost circulation treatment slurries 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the exemplary lost circulation treatment slurries 122.

The lost circulation treatment slurries 122 may directly or indirectly affect the pump 120, which representatively includes any conduits, pipelines, trucks, tubulars, and/or pipes used to fluidically convey the lost circulation treatment slurries 122 downhole, any pumps, compressors, or motors (e.g., topside or downhole) used to drive the lost circulation treatment slurries 122 into motion, any valves or related joints used to regulate the pressure or flow rate of the lost circulation treatment slurries 122, and any sensors (e.g., pressure, temperature, flow rate, etc.), gauges, and/or combinations thereof, and the like. The disclosed lost circulation treatment slurries 122 may also directly or indirectly affect the mixing hopper 134 and the retention pit 132 and their assorted variations.

The disclosed lost circulation treatment slurries 122 may also directly or indirectly affect the various downhole equipment and tools that may come into contact with the lost circulation treatment slurries 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed lost circulation treatment slurries 122 may also directly or indirectly affect any downhole heat exchangers, valves and corresponding actuation devices, tool seals, packers and other wellbore isolation devices or components, and the like associated with the wellbore 116. The disclosed lost circulation treatment slurries 122 may also directly or indirectly affect the drill bit 114, which may include, but is not limited to, roller cone bits, PDC bits, natural diamond bits, any hole openers, reamers, coring bits, etc.

While not specifically illustrated herein, the disclosed lost circulation treatment slurries 122 may also directly or indirectly affect any transport or delivery equipment used to convey the lost circulation treatment slurries 122 to the wellbore drilling assembly 100 such as, for example, any transport vessels, conduits, pipelines, trucks, tubulars, and/or pipes used to fluidically move the lost circulation treatment slurries 122 from one location to another, any pumps, compressors, or motors used to drive the lost circulation treatment slurry 122 into motion, any valves or related joints used to regulate the pressure or flow rate of the lost circulation treatment slurries 122, and any sensors (e.g., pressure and temperature), gauges, and/or combinations thereof, and the like.

Figure 2:
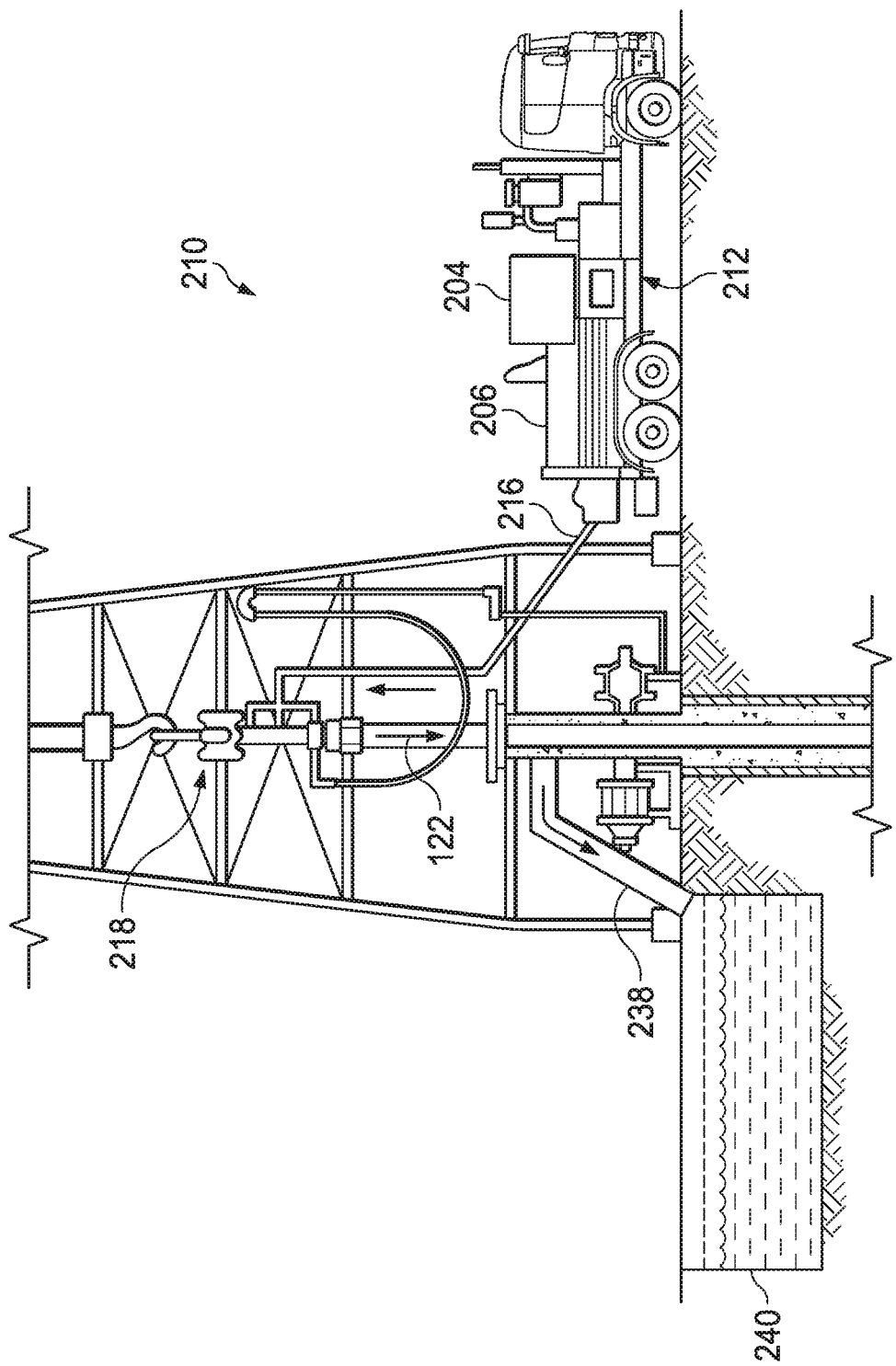
FIG. 2 is a schematic illustrating surface equipment that may be used in the placement of a two-part thixotropic lost circulation slurry into a lost circulation zone in accordance with the examples disclosed herein.
Figure 3:
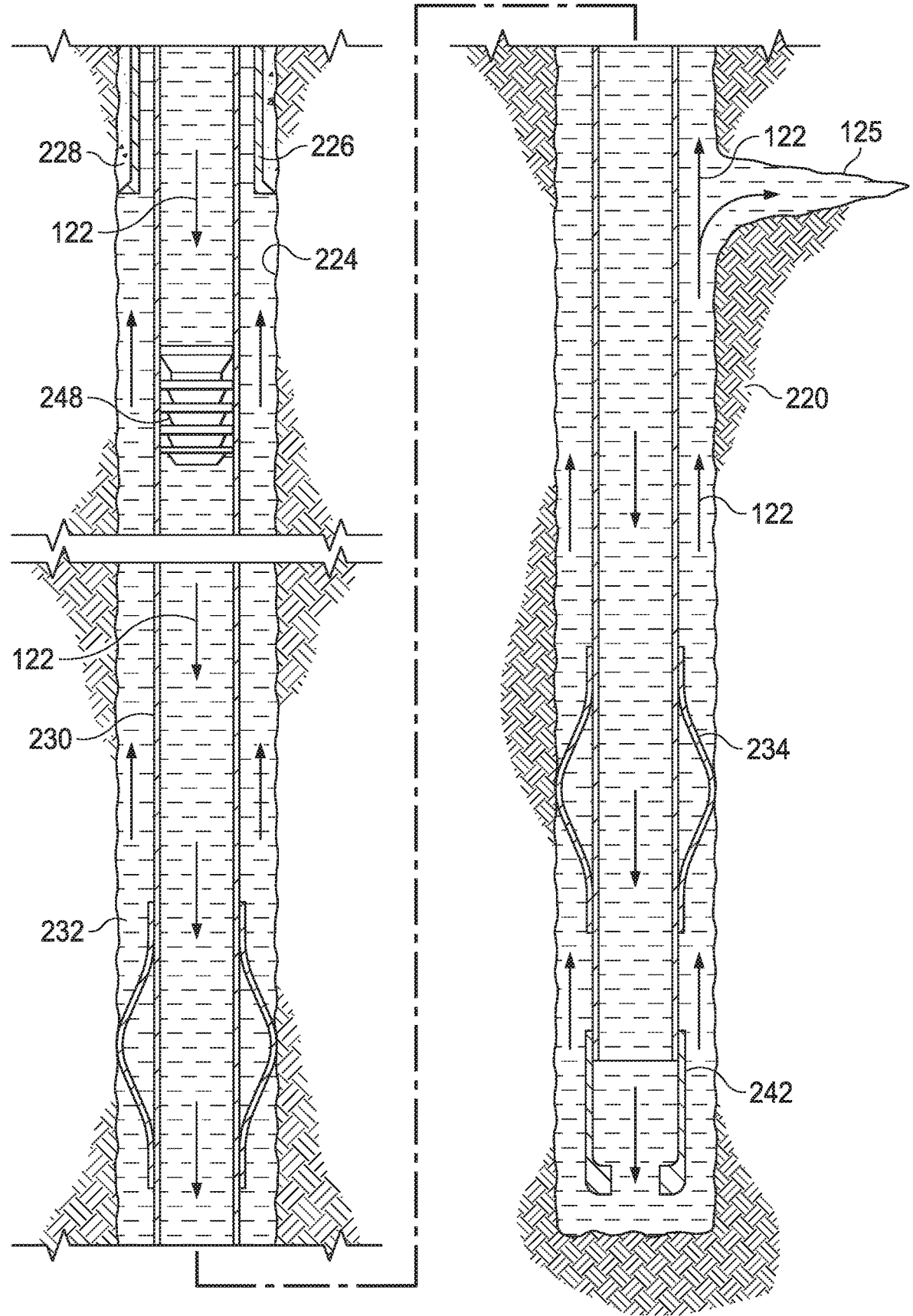
FIG. 3 is a schematic illustrating the placement of a two-part thixotropic lost circulation slurry into a lost circulation zone in accordance with the examples disclosed herein.

FIGS. 2 and 3 illustrate an example technique for placing a lost circulation treatment slurry 122 into a lost circulation zone 125 while cementing equipment and casing are present in the wellbore 222. Such an embodiment may be used, for example, when it is desired to reduce the loss of a spacer fluid or a cement into a lost circulation zone 125. The lost circulation treatment slurry 122 is the same as described in FIG. 1 above, and may represent either the individual pozzolan slurry or the calcium slurry (i.e. either of the two component slurries), or the two-part thixotropic lost circulation slurry (i.e. the combined slurry). Moreover, the various methods of introduction of the lost circulation treatment slurry 122 are the same as described in FIG. 1 above. To reiterate, an individual component slurry may be introduced into the lost circulation zone 125 independently of the other component slurry. The remaining component slurry may then be separately introduced into the lost circulation zone 125 to form the two-part thixotropic lost circulation slurry in the lost circulation zone 125. Alternatively, the two component slurries may be mixed in a conduit downhole during pumping to form the two-part thixotropic lost circulation slurry in the wellbore 222, which is then placed in the lost circulation zone 125. Alternatively, the two component slurries may be mixed at the surface and the two-part thixotropic lost circulation slurry is introduced into the wellbore 222 as the lost circulation treatment slurry 122, which is then placed in the lost circulation zone 125.

FIG. 2 illustrates surface equipment 210 that may be used in placement of the lost circulation treatment slurries 122 in accordance with certain examples. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. Additionally, it should be noted that the lost circulation treatment slurries 122 may be introduced prior to, concurrently with, or subsequent to the introduction of any other treatment fluid (e.g., a spacer fluid, cement composition, etc.) into the wellbore 222. As illustrated by FIG. 2, the surface equipment 210 may include a cementing unit 212, which may include one or more cement trucks. The cementing unit 212 may include mixing equipment 204 and pumping equipment 206 as will be apparent to those of ordinary skill in the art. The cementing unit 212 may pump a lost circulation treatment slurry 122 through a feed pipe 216 and to a cementing head 218 that conveys the lost circulation treatment slurry 122 downhole.

Turning now to FIG. 3, a lost circulation treatment slurry 122 may be placed into a lost circulation zone 125 in accordance with example embodiments. As illustrated, wellbore 222 may be drilled into the subterranean formation 220. While wellbore 222 is shown extending generally vertically into the subterranean formation 220, the principles described herein are also applicable to wellbores that extend at an angle through the subterranean formation 220, such as horizontal and slanted wellbores. As illustrated, the wellbore 222 comprises walls 224 with a lost circulation zone 125. In the illustrated embodiment, a surface casing 226 has been inserted into the wellbore 222. The surface casing 226 may be cemented to the walls 224 of the wellbore 222 by a cement sheath 228. In the illustrated example, one or more additional conduits (e.g., intermediate casing, production casing, liners, etc.), shown here as casing 230, may also be disposed in the wellbore 222. As illustrated, there is a wellbore annulus 232 formed between the casing 230 and the walls 224 of the wellbore 222 and/or the surface casing 226. One or more centralizers 234 may be attached to the casing 230, for example, to centralize the casing 230 in the wellbore 222 prior to and during the cementing operation.

With continued reference to FIG. 3, the lost circulation treatment slurry 122 may be pumped down the interior of the casing 230. The lost circulation treatment slurry 122 may be allowed to flow down the interior of the casing 230 through the casing shoe 242 at the bottom of the casing 230 and up around the casing 230 into the wellbore annulus 232. As the lost circulation treatment slurry 122 flows upward through the wellbore annulus 232, the lost circulation treatment slurry 122 may contact the lost circulation zone 125. If the lost circulation treatment slurry 122 contacts a lost circulation zone 125, the lost circulation treatment slurry 122 may flow into the lost circulation zone 125 and become static if sufficiently removed from a shear force. If static, the lost circulation treatment slurry 122 may rapidly develop gel strength. Once sufficiently gelled, the lost circulation treatment slurry 122 may then seal or restrict fluid loss through the lost circulation zone 125 preventing the loss of any treatment fluids (not shown) that subsequently flow adjacent to lost circulation zone 125.

When the two-part thixotropic lost circulation slurry is disposed in the lost circulation zone 125, either through its direct introduction, or by mixing the pozzolan slurry and the calcium slurry in the lost circulation zone 125, the two-part thixotropic lost circulation slurry may be allowed to harden into a mass within the lost circulation zone 125. The hardened mass may resist being removed from the lost circulation zone 125, for example, through vacuum or erosion of the surrounding subterranean formation 220. Any of the lost circulation treatment slurry 122 that does not contact a lost circulation zone 125 may exit the wellbore annulus 232 via a flow line 238 and be deposited, for example, in one or more retention pits 240 (e.g., a mud pit), as illustrated in FIG. 2.

While not illustrated, other wellbore introduction techniques may also be utilized for introduction of the lost circulation treatment slurry 122 into the wellbore 222. By way of example, reverse circulation techniques may be used that include introducing the lost circulation treatment slurry 122 into the lost circulation zone 125 by way of the wellbore annulus 232 instead of through the casing 230.

It should be clearly understood that the examples illustrated by FIGS. 1-3 are merely general applications of the principles of this disclosure in practice, and a wide variety of other examples are possible. Therefore, the scope of this disclosure is not limited in any manner to the details of FIGS. 1-3 described herein.

It is also to be recognized that the disclosed treatment slurries may also directly or indirectly affect the various downhole equipment and tools that may come into contact with the treatment slurries during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-3.

Provided are methods of reducing lost circulation in a wellbore in accordance with the disclosure and the illustrated FIGs. An example method comprises providing a pozzolan slurry comprising a pozzolanic material and water; providing a calcium slurry comprising a calcium source, a high pH activator, and water; allowing the pozzolan slurry and the calcium slurry to remain separate; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent; mixing the pozzolan slurry and the calcium slurry to form a two-part thixotropic lost circulation slurry after the allowing the pozzolan slurry and the calcium slurry to remain separate; introducing the two-part thixotropic lost circulation slurry to a lost circulation zone within the wellbore; and allowing or causing to allow the two-part thixotropic lost circulation slurry to set into a hardened mass within the lost circulation zone.

Additionally or alternatively, the method may include one or more of the following features individually or in combination. The introducing the two-part thixotropic lost circulation slurry to the lost circulation zone within the wellbore may further comprise introducing one of the pozzolan slurry or the calcium slurry into the lost circulation zone before the other; wherein the pozzolan slurry and the calcium slurry mix within the lost circulation zone to introduce the two-part thixotropic lost circulation slurry to the lost circulation zone. The pozzolan slurry and the calcium slurry may be separated by a foam ball, a dart, or a plug during the introducing one of the pozzolan slurry or the calcium slurry into the lost circulation zone before the other. The pozzolan slurry and the calcium slurry may be separated by a fluid during the introducing one of the pozzolan slurry or the calcium slurry into the lost circulation zone before the other. The introducing the two-part thixotropic lost circulation slurry to the lost circulation zone within the wellbore may further comprise mixing the pozzolan slurry and calcium slurry in the wellbore to form the two-part thixotropic lost circulation slurry in the wellbore and then introducing the formed two-part thixotropic lost circulation slurry to the lost circulation zone. The introducing the two-part thixotropic lost circulation slurry to the lost circulation zone within the wellbore may further comprise mixing the pozzolan slurry and calcium slurry at the surface to form the two-part thixotropic lost circulation slurry at the surface and then introducing the formed two-part thixotropic lost circulation slurry into the wellbore and then to the lost circulation zone. The pozzolanic material may be selected from the group consisting of fly ash, micro-fine silica, silica flour, silica fume, fumed silica, nanosilica, perlite, natural glass, synthetic glass, metakaolin, biomass ash, diatomaceous earth, a natural pozzolan, slag, cenospheres, and any combinations thereof. The calcium source may be selected from the group consisting of hydrated lime, slaked lime, limestone, quicklime, calcium aluminate, calcium nitrate, a calcium salt, and any combinations thereof. The thixotropic material may be selected from the group consisting of illite, montmorillonite, hectorite, bentonite, sepiolite, synthetic versions thereof, welan gum, xantham gum, diutan, schleroglucans, and any combinations thereof. The high pH activator may be selected from the group consisting of sodium hydroxide, magnesium hydroxide, potassium hydroxide, calcium hydroxide, and any combinations thereof. The pozzolan slurry may further comprise a set retarder, wherein the set retarder is selected from the group consisting of phosphonic acids, lignins, lignosulfonates, organic acids, synthetic co- or ter-polymers comprising sulfonate and carboxylic acid groups, derivatives thereof, and any combinations thereof.

Provided are methods of reducing lost circulation in a wellbore in accordance with the disclosure and the illustrated FIGs. An example method comprises drilling the wellbore with a drilling fluid; providing a pozzolan slurry comprising a pozzolanic material and water; providing a calcium slurry comprising a calcium source, a high pH activator, and water; allowing the pozzolan slurry and the calcium slurry to remain separate; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent; mixing the pozzolan slurry and the calcium slurry to form a two-part thixotropic lost circulation slurry after the allowing the pozzolan slurry and the calcium slurry to remain separate; pumping at least one of the pozzolan slurry, the calcium slurry, or the two-part thixotropic lost circulation slurry through a bottom hole assembly disposed within the wellbore; introducing the two-part thixotropic lost circulation slurry to a lost circulation zone within the wellbore; and allowing or causing to allow the two-part thixotropic lost circulation slurry to set into a hardened mass within the lost circulation zone; wherein at least a portion of the drilling fluid is circulated past the hardened mass.

Additionally or alternatively, the method may include one or more of the following features individually or in combination. The introducing the two-part thixotropic lost circulation slurry to the lost circulation zone within the wellbore may further comprise introducing one of the pozzolan slurry or the calcium slurry into the lost circulation zone before the other; wherein the pozzolan slurry and the calcium slurry mix within the lost circulation zone to introduce the two-part thixotropic lost circulation slurry to the lost circulation zone. The pozzolan slurry and the calcium slurry may be separated by a foam ball, a dart, or a plug during the introducing one of the pozzolan slurry or the calcium slurry into the lost circulation zone before the other. The pozzolan slurry and the calcium slurry may be separated by a fluid during the introducing one of the pozzolan slurry or the calcium slurry into the lost circulation zone before the other. The introducing the two-part thixotropic lost circulation slurry to the lost circulation zone within the wellbore may further comprise mixing the pozzolan slurry and calcium slurry in the wellbore to form the two-part thixotropic lost circulation slurry in the wellbore and then introducing the formed two-part thixotropic lost circulation slurry to the lost circulation zone. The introducing the two-part thixotropic lost circulation slurry to the lost circulation zone within the wellbore may further comprise mixing the pozzolan slurry and calcium slurry at the surface to form the two-part thixotropic lost circulation slurry at the surface and then introducing the formed two-part thixotropic lost circulation slurry into the wellbore and then to the lost circulation zone. The pozzolanic material may be selected from the group consisting of fly ash, micro-fine silica, silica flour, silica fume, fumed silica, nanosilica, perlite, natural glass, synthetic glass, metakaolin, biomass ash, diatomaceous earth, a natural pozzolan, slag, cenospheres, and any combinations thereof. The calcium source may be selected from the group consisting of hydrated lime, slaked lime, limestone, quicklime, calcium aluminate, calcium nitrate, a calcium salt, and any combinations thereof. The thixotropic material may be selected from the group consisting of illite, montmorillonite, hectorite, bentonite, sepiolite, synthetic versions thereof, welan gum, xantham gum, diutan, schleroglucans, and any combinations thereof. The high pH activator may be selected from the group consisting of sodium hydroxide, magnesium hydroxide, potassium hydroxide, calcium hydroxide, and any combinations thereof. The pozzolan slurry may further comprise a set retarder, wherein the set retarder is selected from the group consisting of phosphonic acids, lignins, lignosulfonates, organic acids, synthetic co- or ter-polymers comprising sulfonate and carboxylic acid groups, derivatives thereof, and any combinations thereof.

Provided are systems of reducing lost circulation in a wellbore in accordance with the disclosure and the illustrated FIGs. An example system comprises a pozzolan slurry comprising a pozzolanic material and water; a calcium slurry comprising a calcium source, a high pH activator, and water; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent; mixing equipment capable of mixing the pozzolan slurry or the calcium slurry; pumping equipment capable of pumping the pozzolan slurry or the calcium slurry.

Additionally or alternatively, the method may include one or more of the following features individually or in combination. The system may further comprise a drill string having a bottom hole assembly. The mixing equipment may be capable of mixing the pozzolan slurry and the calcium slurry together. The pozzolan slurry and the calcium slurry may be separated by a foam ball, a dart, or a plug during the introducing one of the pozzolan slurry or the calcium slurry into the lost circulation zone before the other. The pozzolan slurry and the calcium slurry may be separated by a fluid during the introducing one of the pozzolan slurry or the calcium slurry into the lost circulation zone before the other. The pozzolanic material may be selected from the group consisting of fly ash, micro-fine silica, silica flour, silica fume, fumed silica, nanosilica, perlite, natural glass, synthetic glass, metakaolin, biomass ash, diatomaceous earth, a natural pozzolan, slag, cenospheres, and any combinations thereof. The calcium source may be selected from the group consisting of hydrated lime, slaked lime, limestone, quicklime, calcium aluminate, calcium nitrate, a calcium salt, and any combinations thereof. The thixotropic material may be selected from the group consisting of illite, montmorillonite, hectorite, bentonite, sepiolite, synthetic versions thereof, welan gum, xantham gum, diutan, schleroglucans, and any combinations thereof. The high pH activator may be selected from the group consisting of sodium hydroxide, magnesium hydroxide, potassium hydroxide, calcium hydroxide, and any combinations thereof. The pozzolan slurry may further comprise a set retarder, wherein the set retarder is selected from the group consisting of phosphonic acids, lignins, lignosulfonates, organic acids, synthetic co- or ter-polymers comprising sulfonate and carboxylic acid groups, derivatives thereof, and any combinations thereof.

EXAMPLES

The present disclosure may be better understood by reference to the following examples, which are offered by way of illustration. The present disclosure is not limited to the examples provided herein.

Example 1

Example 1 illustrates an example composition of a two-part thixotropic lost circulation slurry. Slurry A is the pozzolan slurry and Slurry B is the calcium slurry. The different LNG compositions are illustrated in Table 1 below. Both Slurry A and Slurry B were stored as liquids for 52 days. Both slurries exhibit sufficient yield points, gel strength, and viscosity to prevent sedimentation of suspended solids during the storage time frame. The compositions of Slurry A and Slurry B are illustrated below in Table 1.

TABLE 1

Slurry A and Slurry B Compositions

| | Weights (g) |
|---|---|
| Slurry A Components | |
| Water | 375.0 |
| Volcanic Glass | 500.0 |
| Weighting Agent | 30.0 |
| Dispersant | 3.5 |
| Synthetic Hectorite Clay | 7.5 |
| Slurry B Components | |
| Water | 350.0 |
| Calcium Hydroxide | 350.0 |
| Weighting Agent | 70.0 |
| Dispersant | 2.0 |

Upon contact of Slurry A with Slurry B a dramatic increase in shear stress at low shear rates occurs, indicating rapid gel strength development. The gel strength development is sufficient to reduce the leakage of the formed two-part thixotropic lost circulation slurry into the formation. These results are illustrated below in Tables 2-4.

TABLE 2

Slurry A - Yield Points, Gel Strength, and Viscosity Measurements Slurry A

| | Shear Stress (Pa) | | | |
|---|---|---|---|---|
| Shear Rate ($s^{-1}$) | 0 Days | 5 Days | 11 Days | 52 Days |
| 135 | 23.7 | 27.4 | 30.0 | 32.1 |
| 90 | 19.5 | 22.1 | 24.2 | 25.2 |
| 45 | 16.3 | 15.8 | 18.4 | 19.5 |
| 2.7 | 11.0 | 4.2 | 6.8 | 11.0 |
| 1.4 | 10.5 | 3.2 | 5.3 | 9.5 |
| | Gel Strength and Viscosity | | | |
| Slurry Properties | 0 Days | 5 Days | 11 Days | 52 Days |
| 10 s (Pa) | 7.9 | 2.6 | 3.7 | 15.3 |
| 10 min (Pa) | 75.7 | 8.9 | 5.8 | 34.2 |
| Yield Point (Pa) | 10.1 | 0.1 | 1.1 | 9.3 |
| Plastic Viscosity (cP) | 50.5 | 75.5 | 5.4 | 129.7 |

TABLE 3

Slurry B - Yield Points, Gel Strength, and Viscosity Measurements Slurry A

| | Shear Stress (Pa) | | | |
|---|---|---|---|---|
| Shear Rate ($s^{-1}$) | 0 Days | 5 Days | 11 Days | 52 Days |
| 135 | 23.7 | 27.4 | 30.0 | 32.1 |
| 90 | 19.5 | 22.1 | 24.2 | 25.2 |
| 45 | 16.3 | 15.8 | 18.4 | 19.5 |
| 2.7 | 11.0 | 4.2 | 6.8 | 11.0 |
| 1.4 | 10.5 | 3.2 | 5.3 | 9.5 |
| | Gel Strength and Viscosity | | | |
| Slurry Properties | 0 Days | 5 Days | 11 Days | 52 Days |
| 10 s (Pa) | 7.9 | 2.6 | 3.7 | 15.3 |
| 10 min (Pa) | 75.7 | 8.9 | 5.8 | 34.2 |
| Yield Point (Pa) | 10.1 | 0.1 | 1.1 | 9.3 |
| Plastic Viscosity (cP) | 50.5 | 75.5 | 5.4 | 129.7 |

TABLE 4

Shear Stress of the Combined Slurry A and Slurry B

| Shear Stress ($s^{-1}$) | Shear Stress (Pa) |
|---|---|
| 2.7 | 83.6 |
| 1.4 | 83.6 |

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of reducing lost circulation in a wellbore, the method comprising:
   providing a pozzolan slurry comprising a pozzolanic material and water;
   providing a calcium slurry comprising a calcium source, a high pH activator, and water;
   allowing the pozzolan slurry and the calcium slurry to remain separate;
   wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent;

mixing the pozzolan slurry and the calcium slurry to form a two-part thixotropic lost circulation slurry after the allowing the pozzolan slurry and the calcium slurry to remain separate;

introducing the two-part thixotropic lost circulation slurry to a lost circulation zone within the wellbore; and allowing or causing to allow the two-part thixotropic lost circulation slurry to set into a hardened mass within the lost circulation zone.

2. The method of claim 1, wherein the introducing the two-part thixotropic lost circulation slurry to the lost circulation zone within the wellbore further comprises introducing one of the pozzolan slurry or the calcium slurry into the lost circulation zone before the other; wherein the pozzolan slurry and the calcium slurry mix within the lost circulation zone to introduce the two-part thixotropic lost circulation slurry to the lost circulation zone.

3. The method of claim 2, wherein the pozzolan slurry and the calcium slurry are separated by a foam ball, a dart, or a plug during the introducing one of the pozzolan slurry or the calcium slurry into the lost circulation zone before the other.

4. The method of claim 2, wherein the pozzolan slurry and the calcium slurry are separated by a fluid during the introducing one of the pozzolan slurry or the calcium slurry into the lost circulation zone before the other.

5. The method of claim 1, wherein the introducing the two-part thixotropic lost circulation slurry to the lost circulation zone within the wellbore further comprises mixing the pozzolan slurry and calcium slurry in the wellbore to form the two-part thixotropic lost circulation slurry in the wellbore and then introducing the formed two-part thixotropic lost circulation slurry to the lost circulation zone.

6. The method of claim 1, wherein the introducing the two-part thixotropic lost circulation slurry to the lost circulation zone within the wellbore further comprises mixing the pozzolan slurry and calcium slurry at the surface to form the two-part thixotropic lost circulation slurry at the surface and then introducing the formed two-part thixotropic lost circulation slurry into the wellbore and then to the lost circulation zone.

7. The method of claim 1, wherein the pozzolanic material is selected from the group consisting of fly ash, micro-fine silica, silica flour, silica fume, fumed silica, nanosilica, perlite, natural glass, synthetic glass, metakaolin, biomass ash, diatomaceous earth, a natural pozzolan, slag, cenospheres, and any combinations thereof.

8. The method of claim 1, wherein the calcium source is selected from the group consisting of hydrated lime, slaked lime, limestone, quicklime, calcium aluminate, calcium nitrate, a calcium salt, and any combinations thereof.

9. The method of claim 1, wherein the thixotropic material is selected from the group consisting of illite, montmorillonite, hectorite, bentonite, sepiolite, synthetic versions thereof, welan gum, xantham gum, diutan, schleroglucans, and any combinations thereof.

10. The method of claim 1, wherein the high pH activator is selected from the group consisting of sodium hydroxide, magnesium hydroxide, potassium hydroxide, calcium hydroxide, and any combinations thereof.

11. The method of claim 1, wherein the pozzolan slurry further comprises a set retarder, wherein the set retarder is selected from the group consisting of phosphonic acids, lignins, lignosulfonates, organic acids, synthetic co- or ter- polymers comprising sulfonate and carboxylic acid groups, derivatives thereof, and any combinations thereof.

12. A method of reducing lost circulation in a wellbore, the method comprising:

drilling the wellbore with a drilling fluid;

providing a pozzolan slurry comprising a pozzolanic material and water;

providing a calcium slurry comprising a calcium source, a high pH activator, and water;

allowing the pozzolan slurry and the calcium slurry to remain separate; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent;

mixing the pozzolan slurry and the calcium slurry to form a two-part thixotropic lost circulation slurry after the allowing the pozzolan slurry and the calcium slurry to remain separate;

pumping at least one of the pozzolan slurry, the calcium slurry, or the two-part thixotropic lost circulation slurry through a bottom hole assembly disposed within the wellbore;

introducing the two-part thixotropic lost circulation slurry to a lost circulation zone within the wellbore; and allowing or causing to allow the two-part thixotropic lost circulation slurry to set into a hardened mass within the lost circulation zone; wherein at least a portion of the drilling fluid is circulated past the hardened mass.

13. The method of claim 12, wherein the introducing the two-part thixotropic lost circulation slurry to the lost circulation zone within the wellbore further comprises introducing one of the pozzolan slurry or the calcium slurry into the lost circulation zone before the other; wherein the pozzolan slurry and the calcium slurry mix within the lost circulation zone to introduce the two-part thixotropic lost circulation slurry to the lost circulation zone.

14. The method of claim 13, wherein the pozzolan slurry and the calcium slurry are separated by a foam ball, a dart, or a plug during the introducing one of the pozzolan slurry or the calcium slurry into the lost circulation zone before the other.

15. The method of claim 13, wherein the pozzolan slurry and the calcium slurry are separated by a fluid during the introducing one of the pozzolan slurry or the calcium slurry into the lost circulation zone before the other.

16. The method of claim 12, wherein the introducing the two-part thixotropic lost circulation slurry to the lost circulation zone within the wellbore further comprises mixing the pozzolan slurry and calcium slurry in the wellbore to form the two-part thixotropic lost circulation slurry in the wellbore and then introducing the formed two-part thixotropic lost circulation slurry to the lost circulation zone.

17. The method of claim 12, wherein the introducing the two-part thixotropic lost circulation slurry to the lost circulation zone within the wellbore further comprises mixing the pozzolan slurry and calcium slurry at the surface to form the two-part thixotropic lost circulation slurry at the surface and then introducing the formed two-part thixotropic lost circulation slurry into the wellbore and then to the lost circulation zone.

18. A system for reducing lost circulation in a wellbore, the system comprising:

a pozzolan slurry comprising a pozzolanic material and water;

a calcium slurry comprising a calcium source, a high pH activator, and water; wherein at least one of the pozzolan slurry and the calcium slurry comprise a thixotropic material; wherein at least one of the pozzolan slurry and the calcium slurry comprise a dispersant; wherein at least one of the pozzolan slurry and the calcium slurry comprise a weighting agent;

mixing equipment capable of mixing the pozzolan slurry or the calcium slurry; and pumping equipment capable of pumping the pozzolan slurry or the calcium slurry.

19. The system of claim 18, further comprising a drill string having a bottom hole assembly.

20. The system of claim 18, wherein the mixing equipment is capable of mixing the pozzolan slurry and the calcium slurry together.

\* \* \* \* \*